United States Patent [19]

Chieng

[11] Patent Number: 5,165,907
[45] Date of Patent: Nov. 24, 1992

[54] METHOD OF PRODUCTION OF HIGH PURITY SILICA AND AMMONIUM FLUORIDE

[75] Inventor: Paul C. Chieng, St. Louis, Mo.

[73] Assignee: IMCERA Group Inc., Northbrook, Ill.

[21] Appl. No.: 634,360

[22] Filed: Dec. 31, 1990

Related U.S. Application Data

[63] Continuation of Ser. No. 181,380, Apr. 14, 1988, Pat. No. 4,981,664.

[51] Int. Cl.$^5$ .................. C01B 33/12; C01C 01/16
[52] U.S. Cl. .................. 423/339; 423/335; 423/470; 423/471
[58] Field of Search .............. 423/339, 341, 342, 483, 423/484, 470, 471

[56] References Cited

U.S. PATENT DOCUMENTS

| | | | |
|---|---|---|---|
| 2,780,522 | 2/1957 | Gloss et al. | 423/470 |
| 4,981,664 | 1/1991 | Chieng | 423/339 |

OTHER PUBLICATIONS

Perry et al., "Perry's Chemical Engineers' Handbook", 6th Ed., pp. 19-28–19-29.
Slack, *Phosphoric Acid*, Marcel Dekker, Inc. N.Y., N.Y., (1968), pp. 163–169.
Weast, Handbook of Chemistry and Physics, CRC Press, Cleveland, Ohio (195), p. F-7.

*Primary Examiner*—Olik Chaudhuri
*Assistant Examiner*—Ken Horton
*Attorney, Agent, or Firm*—Wendell Ray Guffey; William J. Fisher; Thomas L. Farquer

[57] ABSTRACT

A method for producing high purity silica and ammonium fluoride from silicon tetrafluoride-containing gas wherein silicon tetrafluoride-containing gas from the acidulation of phosphorus-containing rock is recovered and the liquid entrainment is separated from the gas. The recovered gas is converted to an ammonium fluosilicate solution and is ammoniated to produce high purity silica and ammonium fluoride. The recovered gas can be converted to an ammonium fluosilicate solution either by absorbing the gas directly in a solution of ammonium fluoride or by first absorbing the gas in water to produce fluosilicic acid and then reacting the fluosilicic acid with ammonia or ammonium fluoride. In a second aspect, the invention provides a method of separately recovering high purity silica and ammonium fluoride from an impure aqueous fluosilicic acid solution by reacting the fluosilicic acid solution with ammonia or ammonium fluoride for a time and at a temperature sufficient to form ammonium fluosilicate solution, recovering solid ammonium fluosilicate from the solution, purifying the solid ammonium fluosilicate by dissolving the solid in high purity water or ammonium fluosilicate solution, recrystallizing solid ammonium fluosilicate, and recovering purified ammonium fluosilicate crystals from the solution, forming an aqueous solution of the purified ammonium fluosilicate crystals and ammoniating the solution for a time and at a temperature sufficient to precipitate silica, and separately recovering high purity silica and ammonium fluoride.

15 Claims, 1 Drawing Sheet

METHOD OF PRODUCTION OF HIGH PURITY SILICA AND AMMONIUM FLUORIDE

This application is a continuation of U.S. Pat. No. 4,981,664 entitled "Method of Production of High Purity Silica and Ammonium Fluoride."

BACKGROUND OF THE INVENTION

1. Field of the Invention

The present invention relates to a method for producing high purity silica and ammonium fluoride. More particularly, the invention relates to a method of recovering high purity silica and ammonium fluoride from an impure fluoride-containing source.

2. Description of Related Art

Chemically-combined fluorine typically is present in substantially all phosphorus-containing rock (phosphate rock), such as fluorapatite and mineral phosphates. Generally, such phosphate rock contains as much as 4 wt. percent fluorine. When phosphate rock is reacted with an acid, such as sulfuric acid or hydrochloric acid, much of the fluorine value of the rock is liberated as an undesired by-product in the gaseous phase, e.g., as silicon tetrafluoride. Gaseous silicon tetrafluoride also is liberated when phosphoric acid is concentrated, as in the production of phosphate-containing fertilizers or wet process phosphoric acid.

The noxious nature of silicon tetrafluoride requires that it be removed from the gaseous phase to avoid atmospheric pollution. Gaseous silicon tetrafluoride usually is recovered by absorption in water; the gas is passed through water absorption vessels or Venturi scrubbers. Absorption of silicon tetrafluoride in water yields aqueous fluosilicic acid solution and silica precipitate.

In the wet process method of making phosphoric acid, weak phosphoric acid typically is returned to the attack tank. However, in one method known in the art, the weak phosphoric acid is treated with sulfuric acid. The heat of dilution of the sulfuric acid is used to strip, as vapor, fluorine values from the dehydration of fluosilicic acid in the weak phosphoric acid. The fluorine is recovered primarily as silicon tetrafluoride; some hydrogen fluoride is also recovered. This vapor is absorbed in water, yielding fluosilicic acid and silica precipitate.

The market value of fluosilicic acid, and of fluosilicates derived therefrom, is not sufficiently high, however, to make their production econonmically attractive. It has been an object of the prior art to utilize by-product silicon tetrafluoride to produce other products having greater market value. Therefore, attempts have been made to develop commercially attractive uses for this by-product.

U.S. Pat. No. 3,271,107 discloses a process for producing silica pigments from fluosilicic acid, generated by absorbing silicon tetrafluoride in water, by reacting fluosilicic acid with ammonium hydroxide in two stages. In the first stage, a less-than-stoichiometric quantity of ammonium hydroxide is added with high agitation to product a slurry having a pH of between 6.0 and 8.0 and containing minute silica particles. The unreacted fluosilicic acid in this slurry then is reacted with sufficient additional ammonium hydroxide to provide a final pH between about 8.3 and 9.0. Pigment quality silica precipitate then is separated from the slurry.

U.S. Pat. No. 3,021,194 discloses a process for producing ammonium bifluoride from fluosilicic acid and ammonium fluoride purportedly without undue loss of ammonia or fluorine. Concentrated fluosilicic acid is reacted with ammonium fluoride, or a mixture of ammonium fluoride and sodium or potassium fluoride, to produce aqueous ammonium acid fluoride (ammonium bifluoride) solution and solid alkali fluosilicate, including ammonium fluosilicate. After separating the solution from the solid alkali fluosilicates, solid ammonium bifluoride is recovered by evaporatively concentrating the solution. Alkali metal fluosilicates can be recovered and sold, or can be converted to alkali fluorides by reaction with additional ammonia. Ammonium fluoride is produced and hydrated silica is precipitated by this ammoniation. The silica is indicated for use as a filler, a flatting agent, or as an insecticide provided it contains some sodium fluoride.

Certain uses of silica require very high purity material. For example, silica used in the encapsulation or packaging of electronic computer chips must have extremely low levels of metal impurities. Typical of these uses is in very large scale integrate (VLSI) microchip applications, where chip manufacturers require silica having extremely low concentrations of certain radioactive elements. For example, uranium and thorium concentrations must be on the order of less than 1 part per billion (ppb). The maximum acceptable level of ionic impurities, including cations such as aluminum, boron, calcium, cobalt, chromium, copper, iron, potassium, magnesium, manganese, sodium, nickel, vanadium, and zinc, and anions containing phosphorus and sulfur, also is less than 10 parts per million (ppm), and often is below 1 part per million.

Other uses for high purity silica material include precision laser optics, fiber optics, and advanced ceramics, including diffusion tubes and crucibles. Presently, these requirements are satisfied predominantly by natural silica sources such as quartz. Unfortunately, prior art processes for recovering silica from contaminated fluosilicic acid starting materials have not been satisfactory for producing a product satisfying these stringent purity requirements.

U.S. Pat. NO. 4,465,657, for example, discloses a process for producing a purified silica from impure fluosilicic acid which basically uses the procedure of the earlier U.S. Pat. No. 3,271,107. Fluosilicic acid is reacted in a first step with a less-than-stoichiometric quantity of ammonium hydroxide to convert some of the acid to ammonium fluoride and silica. The silica precipitate thus produced removes metal ion impurities, presumably at least in part by adsorption, from the residual fluosilicic acid solution. The silica precipitate then is separated, and the remaining solution having a lower level of impurities is reacted in a second stage with additional ammonium hydroxide to produce a purified silica precipitate. Optionally, the residual fluosilicic acid solution from the first precipitation stage may be treated with an ion exchange or chelating agent to purify the solution further prior to the formation of the silica precipitate in the second precipitation stage.

A particular drawback of this procedure is that from 40 to 75 percent of the available silica in the fluosilicic acid is used as the vehicle for removing impurities. Thus, only 25 to 60 percent of the silica values of the fluosilicic acid actually can be recovered in a purified form. Moreover, there is a tacit admission that the two step process does not produce a satisfactory product since it is preferred to treat the solution from the first step process with an ion exchange or chelating agent prior to the second precipitation step.

European Patent Application 0,113,137 attempts to avoid the loss in yield of U.S. Pat. No. 4,456,657 by adding a chelating agent directly to the impure fluosilicate acid solution to improve the purity of the silica by sequestering or chelating multivalent metal ions in the solution before ammoniation. Ion exchange also has been used for the same purpose. However, these techniques tend to introduce other impurities, such as alkali metal ions, into the precipitated silica. Additionally, these prior art purification processes rely upon cationic exchangers and metal chelating agents and thus cannot satisfactorily remove the phosphorus and sulfur impurities generally present as anionic species ($SO_4^{-2}$ and $PO_4^{-3}$) in the fluosilicic acid by-product solutions typically recovered from the acidulation of phosphate rock. Nor can anionic exchange agents be used because the anionic exchange agents significantly decrease the recovery of silica.

High-purity ammonium fluoride is useful as a precursor for making an oxide etchant for electronic applications. Simple evaporation of an aqueous solution of ammonium fluoride liberates ammonia and forms ammonium bifluoride, $NH_4FHF$, or $NH_4HF_2$. Alternatively, ammonium fluoride is also useful as an ammonium source for diammonium phosphate.

Accordingly, it is an object of the present invention to provide a method for recovering high purity silica and ammonium fluoride from the by-products obtained by the acidulation of phosphate rock.

It is another object of the invention to provide a method for producing high quality silica having metal impurity content below 10 ppm, and preferably below 1 ppm, and having radioactive element concentrations below 1 ppb.

It is also an object of this invention to provide a method for producing high-purity ammonium fluoride solution.

SUMMARY OF THE INVENTION

In accordance with these and other objects, this invention provides in a first aspect a method for producing high purity silica and ammonium fluoride from silicon tetrafluoride-containing gas, particularly the gas generated by acidulation, for example with concentrated sulfuric acid, of weak phosphoric acid from the gypsum filtration step of the wet phosphoric acid process, said method comprising:

a. recovering silicon tetrafluoride-containing gas from the acidulation of a fluorine-containing phosphorus source;

b. separating liquid entrainment from the gas;

c. converting the gas recovered from step (b) to an ammonium fluosilicate solution; and d. ammoniating said ammonium fluosilicate solution to produce high purity silica and ammonium fluoride.

The gas recovered from step (b) can be converted to an ammonium fluosilicate solution by absorbing the gas directly in a solution of ammonium fluoride or by first absorbing the gas in water to produce fluosilicic acid and then reacting the fluosilicic acid with ammonia or ammonium fluoride.

In a second aspect, the present invention provides a method of separately recovering high purity silica and ammonium fluoride from an impure aqueous fluosilicic acid solution comprising:

a. reacting the fluosilicic acid solution with ammonia or ammonium fluoride for a time and at a temperature sufficient to form ammonium fluosilicate;

b. recovering solid ammonium fluosilicate from the ammoniated solution;

c. purifying the solid ammonium fluosilicate by dissolving the solid in high purity water or a high purity unsaturated ammonium fluosilicate solution, recrystallizing solid ammonium fluosilicate, and recovering purified ammonium fluosilicate crystals from the solution;

d. forming an aqueous solution of the purified ammonium fluosilicate crystals and ammoniating the solution for a time and at a temperature sufficient to precipitate silica; and e. separately recovering high purity silica and ammonium fluoride.

BRIEF DESCRIPTION OF THE DRAWINGS

In the drawings, like identifiers are sued to identify like parts.

DETAILED DESCRIPTION OF THE INVENTION

Figure 1:
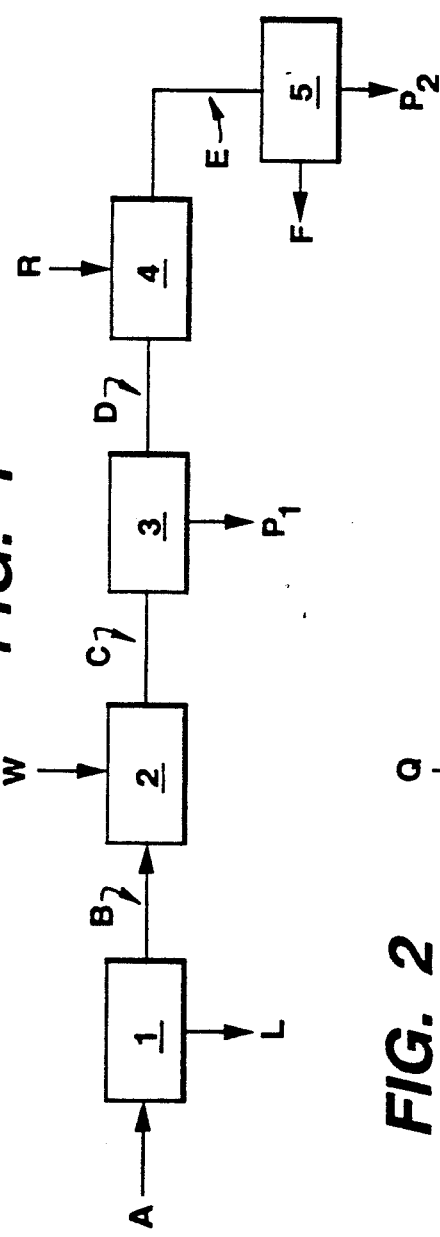
FIG. 1 is a schematic diagram of the production of ammonium fluosilicate solution in accordance with the first aspect of the invention.

The present invention relates to a method of producing high purity silica and ammonium fluoride from impure silicon tetrafluoride-containing gas, particularly the gas generated by acidulation, for example with concentrated sulfuric acid, of weak phosphoric acid from the gypsum filtration step of the wet phosphoric acid process. It has been discovered that high purity silica and ammonium fluoride can be produced from this source of impure silicon tetrafluoride-containing gas using a process which has as one key feature the initial separation of liquid entrainment from the gas. It has been found, quite surprisingly, that the majority of the impurities present in the silicon tetrafluoride-containing gas recovered from the attack tank is removed with the liquid droplets, simply by eliminating the entrained liquid from the gas.

In one embodiment, the silicon tetrafluoride in the gas then is hydrolyzed by absorption in water to produce silica and fluosilicic acid solution. Thereafter, the precipitated silica, which typically adsorbs additional impurities, is separated from the fluosilicic acid solution. The solution then is reacted with ammonium fluoride or ammonia to produce pure ammonium fluosilicate. In an alternative embodiment, the cleaned gaseous silicon tetrafluoride is absorbed in an aqueous ammonium fluoride solution to produce ammonium fluosilicate solution directly.

Ammonium fluosilicate crystals recovered from ammonium fluosilicate solution produced by either embodiment preferably is recrystallized at least once to enrich its purity. When reacted with additional ammonia, this high purity ammonium fluosilicate yields high purity silica and high purity ammonium fluoride products. The method of the invention thus produces valuable high purity silica and ammonium fluoride from an abundant, inexpensive, waste by-product obtained, for example, from the acidulation of phosphorus-containing rock.

The term "high purity silica" refers to silica containing metal impurity concentrations of less than about 10 ppm per metal and individual non-metallic impurity concentrations, especially sulfur and phosphorus concentrations, of less than about 10 ppm. Preferably, the silica has metallic impurity concentrations of less than about 1 ppm and non-metallic impurity concentrations of less than about 5 ppm. The term "high purity silica" also encompasses silica having uranium and thorium concentrations of less than about 1 ppb.

The term "high purity ammonium fluoride" refers to ammonium fluoride solution which, at a concentration of 40 wt. percent, contains metal impurity concentrations of less than about 1 ppm and non-metallic impurity concentrations of less than about 5 ppm. Preferably, the ammonium fluoride has metallic impurity concentrations of less than about 0.1 ppm and non-metallic impurity concentrations of less than about 0.5 ppm.

"High purity," when used to describe a water source or other solution used in carrying out the present invention, means the material has a sufficiently low impurity level that any silica or ammonium fluoride solution ultimately recovered in accordance with the process of the present invention constitutes high purity product as hereinabove defined.

Silicon tetrafluoride-containing gas obtained from the acidulation of phosphorus-containing rock and weak phosphoric acid from the gypsum filtration step of the wet phosphoric acid process, particularly acidulation with concentrated sulfuric acid, often is combined with additional gas obtained from the evaporative concentration of wet process acid and typically is contaminated with multivalent cations and other impurities, such as sulfate and phosphate anions. It has been determined that the majority of these impurities actually are present in a liquid phase which is entrained as small liquid droplets in the gas. Thus, a majority of the impurities, and particularly the cationic impurities, advantageously can be removed from the silicon tetrafluoride-containing gas stream A to a surprisingly large extent simply and conveniently by using an initial gas-liquid separation 1, as illustrated in FIGS. 1 and 2.

Liquid phase L is separated from the gas by using any of the techniques and equipment available in the prior art for scrubbing or cleaning liquid droplets form a gas, such as cyclonic, impingement, or electrostatic separation. Demisting, i.e., causing the gas to pass through a porous filter-like element along a tortuous flow path so that entrained liquid droplets are separated by impingement from the gas flow, is particularly useful. By this separation, metal cations absorbed in the liquid are removed from the gaseous silicon tetrafluoride-containing stream. Unfortunately, some impurities, including sulfate and phosphate anionic impurities, may not be absorbed in the liquid which is separated from the silicon tetrafluoride-containing gas, and thus remain in the gas phase.

Cleaned silicon tetrafluoride-containing gas stream B recovered from the initial separation then is converted to an ammonium fluosilicate solution by one of two alternative procedures. In one case, illustrated in FIG. 1, the gas is absorbed in high purity water to produce fluosilicic acid which thereafter is reacted with ammonia or ammonium fluoride to produce the desired ammonium fluosilicate solution. In an alternative embodiment illustrated in FIG. 2, the gas is absorbed directly in a high purity aqueous ammonium fluoride solution to yield the desired ammonium fluosilicate solution. These absorbents are very pure, and should not contain any impurities which would contaminate the ultimate silica and ammonium fluoride products. Water used to absorb the cleaned silicon tetrafluoride-containing gas or to make the aqueous solution of ammonium fluoride therefore should be essentially free of the above-mentioned impurities.

Figure 2:
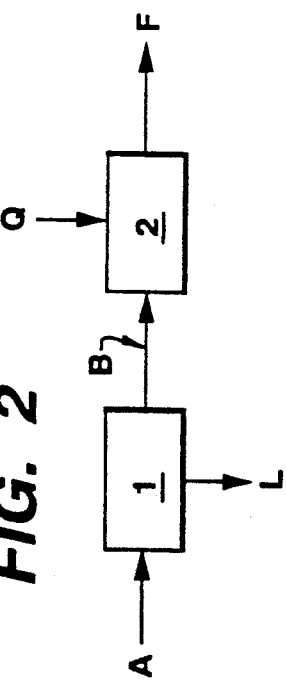
FIG. 2 illustrates an alternative embodiment for production of ammonium fluosilicate solution.

Turning now to FIG. 1 and in accordance with the first alternative, cleaned silicon tetrafluoride-containing gas B is absorbed in water W in absorber 2 to produce fluosilicic acid and silica (together, stream C) in accordance with the following reaction:

$$3\ SiF_4 + 2\ H_2O \rightarrow 2\ H_2SiF_6 + SiO_2 \qquad (I)$$

The absorption reaction occurs at standard conditions known to those skilled in the art. The concentration of fluosilicic acid in stream C which can be produced in this manner typically ranges up to about 35 wt. percent, preferably between about 10 and 30 wt. percent. The reactants and products are very acidic, so equipment line with acid-resistant inert materials should be used, thus helping to avoid undesirable metal cation contamination in the product.

Silica ($SiO_2$) $P_1$ which precipitates in the reaction is separated in separator 3 from the fluosilicic acid solution by filtering, by centrifugation, or by any suitable separation technique known to those skilled in the art. Thereafter, thus-separated fluosilicic acid D is reacted in reactor 4 in accordance with one of the following two reactions to produce ammonium fluosilicate solution E:

$$H_2SiF_6 + 2\ NH_4F \rightarrow (NH_4)_2\ SiF_6 + 2\ HF \qquad (IIa)$$

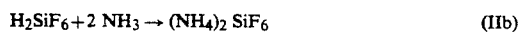

$$H_2SiF_6 + 2\ NH_3 \rightarrow (NH_4)_2\ SiF_6 \qquad (IIb)$$

Reaction II (i.e., either IIa or IIb) typically is carried out at a temperature between about 25+ and 85° C., preferably between about 50° and 60° C.

Reaction IIa is carried out by adding at least about a stoichiometric amount of ammonium fluoride R to the fluosilicic acid D in reactor 4. Failure to add a stoichiometric quantity of ammonium fluoride results in diminution of yield, as all the silicon and fluorine in the fluosilicic acid will not be recovered. An excess of ammonium fluoride improves recovery of fluorine because the double salt $NH_4F\ (NH_4)_2\ SiF_6$ is formed, but requires recycle of solution. Also, ammoniation of the double salt may be more difficult than ammoniation of ammonium fluosilicate solution. Thus, although any quantity of ammonium fluoride can be used, the preferred quantity of ammonium fluoride is between about 100 percent and 120 percent, and more preferably is between about 100 and 100 percent, of the stoichiometric quantity.

In using reaction IIb, ammonia R is slowly sparged into the fluosilicic acid solution in reactor 4 until the first sign of silica formation is observed. A less preferred method is to add the fluosilicic acid solution to an ammonium solution which typically has a concentration of about 30 percent. Silica forms when ammonium fluosilicate is ammoniated, so incipient formation of silica indicates that all the fluosilicic acid has been converted to ammonia fluosilicate. The silica $P_2$ thus formed is removed from the warm ammonium fluosilicate solution F in separator 5 prior to cooling the solution to recover solid ammonium fluosilicate. Any suitable separation technique may be used.

Preferably, cleaned silicon tetrafluoride-containing gas B is absorbed in aqueous ammonium fluoride solution Q in absorber 2 according to the second alternative illustrated schematically in FIG. 2, in accordance with the following reaction:

$$SiF_4 + 2\ NH_4F(aq) \rightarrow (NH_4)_2SiF_6 \qquad (III)$$

As required for reaction I above, equipment should be lined with acid-resistant inert materials to avoid undesirable metal contamination.

Reaction III is exothermic, so cooling may be required, depending upon the equipment design. Typically, the temperature at which this reaction is carried out is allowed to rise from the ambient temperature of the absorbent solution to a temperature below its boiling point. Preferably, the temperature is maintained between the freezing point of the solution and about 85° C. With this approach, an ammonium fluosilicate solution is produced directly from the cleaned gas.

Ammonium fluosilicate produced by the combination of reactions I and II generally is purer than ammonium fluosilicate produced directly by reaction III, because some impurities tend to be adsorbed by the silica precipitated in reaction I. However, the stoichiometry of these alternative reaction paths indicates that the yield of high purity silica and ammonium fluoride should be higher for reaction III than for the combination of reactions I and II. (Silica produced in reaction I is not generally suitable as a high purity product.) Those skilled in the art can resolve the economic balance of yield and product purity against the cost of utilizing subsequent purification steps.

Figure 3:
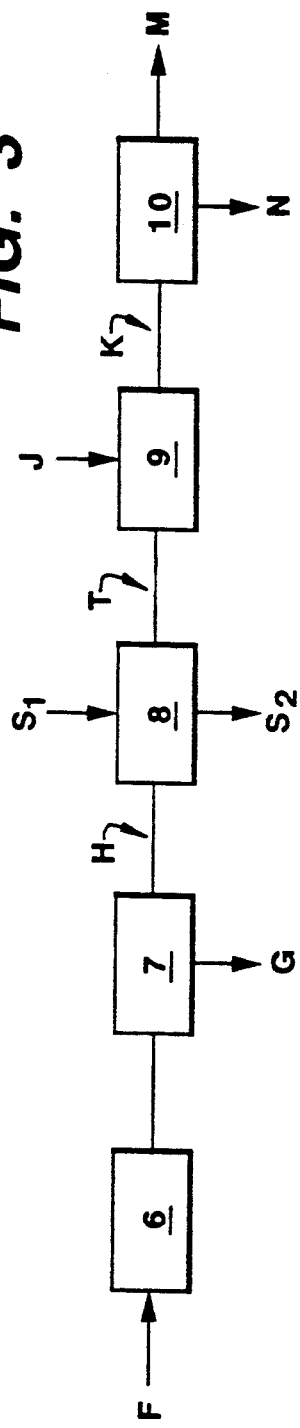
FIG. 3 is a schematic diagram for the method of the second aspect of the invention.

Turning now to FIG. 3, when absorption according to reactions II or III is complete, the temperature of ammonium fluosilicate solution F is lowered to about 15° C. in chiller 6 to produce solid ammonium fluosilicate by crystalliztion. Preferably, the solution is cooled to below about 10° C., and more preferably to below about 5° C. in order to maximize the quantity of ammonium fluosilicate recovered and minimize the residual concentration of ammonium fluosilicate in the mother liquor. Procedures suitable for cooling the ammonium fluosilicate solution will be apparent to those skilled in the art. The solubility of ammonium fluosilicate in water ranges from about 11 percent at 0° C. to about 38 percent at 100° C. Thus, lowering the temperature of the solution lowers the saturation concentration and causes excess ammonium fluosilicate at such lowered temperature to crystallize.

Through proper crystallization of the ammonium fluosilicate, many of the impurities can be eliminated from the desired product. Crystallization is effective for separating the crystallized solid from both cationic metal impurities and anionic mineral impurities, i.e. sulfate and phosphate anions, present in the solution. However, care should be exercised in controlling the rate of cooling and thus the rate of crystallization.

Rapid crystallization of the ammonium fluosilicate results in a less-pure crystalline product because impurities tend to be trapped with the crystal lattice. Rapid crystallization is more prone to occur if the local concentration of reactants is too high. Less inclusion occurs at reasonable crystallization rates. Methods for controlling the crystallization rate will be apparent to those skilled in the art.

After the ammonium fluosilicate solution has been cooled and solid ammonium fluosilicate has crystallized from the solution, the solids H are separated from the solution G in separator 7. Simple filtration and other separation methods known in the art are suitable. Thus-separated ammonium fluosilicate crystals H then may be washed with a solvent in which ammonium fluosilicate is non-soluble, such as acetone, or is only slightly soluble, such as alcohol. Very cold water may be used if the time of exposure of the crystals to the water is minimized. Although use of water avoids the use of organic solvent, it requires that care be exercised to prevent product loss because the crystals are soluble in water. This washing removes surface contamination while the low solubility of ammonium fluosilicate in the solvent minimizes product loss. Of course, the wash fluid should be of high purity.

Ammonium fluosilicate crystals may be purified further by recrystallization in recrystallizer 8. To effect recrystallization, the crystals H first are redissolved in pure liquid water or unsaturated ammonium fluosilicate solution $S_1$ at an elevated temperature. The solubility of ammonium fluosilicate in water increases as temperature increases. Therefore, the fluid $S_1$ in which the ammonium fluosilicate is initially dissolved should be as hot as possible. The temperature of the ammonium fluosilicate solution then is lowered gradually to less than about 15° C., preferably to less than about 10° C., more preferably to less than about 5° C., to recrystallize a more pure solid ammonium fluosilicate I. As above, careful control of the crystallization rate is important to maximize the purity enrichment. Depending on the desired purity, recrystallization may be carried out any number of times, with the reformed crystals being removed from the solution each time. Those skilled in the art can balance economics of initial fluid temperature, cooling conditions, and number of recrystallization steps required to yield a desired purity.

At each separation, the solution $S_2$ remaining after the recrystallization may be recycle or reused. To discard the entire solution after one recrystallization would be quire wasteful, because the solution will be saturated in ammonium fluosilicate at the final temperature. Typically, solution $S_2$ will have an ammonium fluosilicate concentration of at least about 11 wt percent. Thus, the solution should be recycled for further use. Of course, a fraction of the residual fluosilicate solution must be purged to maintain the concentrations of impurities in the recycle at acceptable levels. Thus a small make up stream may be required. Such techniques are known in the art.

Once the desired ammonium fluosilicate purity has been attained, the purified crystals are redissolved in water to yield an aqueous solution of ammonium fluosilicate T. This ammonium fluosilicate solution then is ammoniated in ammoniator 9 by reaction with ammonium J to precipitate high purity silica and yield a high purity ammonium fluoride liquor in accordance with the following reaction:

$$(NH_4)_2SiF_6 + 4\ NH_3 + 2\ H_2O \rightarrow SiO_2 + 6\ NH_4F \qquad (IV)$$

The temperature of the solution during the reaction typically may vary from about 25° to 85° C. The concentration of ammonium fluosilicate in the aqueous solution can range up to about 32 percent, generally is between abut 3 and 25 percent, and most often is between about 10 and 25 percent. Of course, the concentration of ammonium fluosilicate cannot exceed the saturation concentration at the selected temperature.

Thus, if a solution temperature of 25° C. is utilized, the ammonium fluosilicate concentration cannot exceed about 18 wt percent. High concentrations of ammonium fluosilicate are preferred if the desired product is the high purity ammonium fluoride liquor and a more concentrated ammonium fluoride solution. However, lower concentrations are preferred if silica quality is more important.

It has been discovered that the quantity of ammonium fluosilicate crystals which can be treated can be maximized by first introducing ammonia while maintaining the solution temperature between about 75°-85° C. until the ammonium fluosilicate concentration is reduced to between about 5 and 10 wt. percent. Thereafter, the temperature preferably is lowered to between about 40°-60 ° C., preferably between about 45°-55° C., for the remainder of the reaction.

This two-stage ammoniation is advantageous because it affords the opportunity to prepare an ammonium fluoride solution having a concentration of about 40 wt percent. To prepare a 40 percent ammonium fluoride solution requires use of a 32 wt percent ammonium fluosilicate solution. However, this requires that the temperature be maintained at 75°-85° C., i.e., at a temperature at which an ammonium fluosilicate concentration of at least about 32 wt percent can be maintained. At this temperature, introduction of a concentration of ammonia sufficient to convert the ammonium fluosilicate to silica and ammonium fluoride is not possible because of excessive loss of ammonia at higher temperature. Thus, after the ammonium fluosilicate concentration has been lowered to between about 5 and 10 wt percent, the solution temperature is lowered so that the stoichiometric quantity of ammonia can be introduced.

Ammonia can be bubbled through the aqueous ammonium fluosilicate solution until all ammonium fluosilicate is converted to silica and ammonium fluoride. As the reactants are depleted, the rate of silica precipitation will decrease, and will cease completely when the ammonium fluosilicate is completely consumed. Typically, ammonia can be added to the ammonium fluosilicate solution at a rate such that ammonium fluosilicate exhaustion will occur in less than about 30 minutes.

The amount of ammonia utilized is at least about the stoichiometric quantity required to complete reaction IV. Preferably, an excess of between about 5-30 percent, more preferably between about 10-30 percent, and most preferably, between about 20-30 percent of the stoichiometric amount of ammonia is used to ensure that the ammonium fluosilicate is exhausted. Therefore, the quantity of ammonia utilized is at least about 100 percent, preferably is between about 105-130 percent, more preferably is between about 110-130 percent, and most preferably is between about 120 and 130 percent of the stoichiometrically required quantity.

The conditions under which the ammoniation described in reaction IV is carried out affect the properties of this silica precipitate. The stoichiometry, concentration, and temperature all affect the properties of the silica.

Silica precipitate N can be separated from the ammonium fluoride solution M in separator 10 by any suitable separation technique, such as filtration, which is known in the art. A suitable separation should not introduce impurities into the solution or onto the silica. Recovered silica N may be washed with purified water or other suitable solvents to remove residual ammonium fluoride solution from the silica.

Silica precipitate N and ammonium fluoride solution M produced by this reaction will both have a high purity. The high purity ammonium fluoride product M of reaction IV may be recycled as a reactant in reactions IIa and III. Recycle of this high purity ammonium fluoride does not introduce additional impurities at these stages, and therefore may reduce the number of recrystallization steps necessary to achieve a preselected purity. The high purity ammonium fluoride solution recovered in this process also is useful as an etchant e.g. in the manufacture of integrated circuit devices.

The following examples are intended to further illustrate the invention, not to limit the invention in any way. The invention is limited only by the scope of the appended claims.

EXAMPLES 1 AND 2

Five thousand grams of an impure 25 wt. percent fluosilicic acid solution was obtained from a wet process phosphoric acid plant. The fluosilicic acid was prepared by absorbing silicon tetrafluoride gas exiting the attack tank directly in water without removing any liquid entrainment. The acid, which had the impurities listed in the second column of Table 1, was mixed with a stoichiometric quantity of ammonium fluoride (Aldrich Company, Reagent grade) in a high purity silica crucible. Ammonium fluosilicate precipitated during the mixing and was separated by decanting.

The separated ammonium fluosilicate then was added to pure water and dissolved by raising the temperature of the solution to its boiling point. This solution then was cooled to about 2° C. to recrystallize ammonium fluosilicate. This recrystallization procedure was performed three additional times. Throughout recrystallization, the quantity of water was carefully controlled to maintain the concentration of ammonium fluosilicate at just under 38 wt. percent to minimize the loss by dissolution in the mother liquor.

Ammonium fluosilicate crystals recovered from the last recrystallization step were redissolved in purified water without washing. Ammonia, in 20% excess, was charged into the ammonium fluosilicate solution to precipitate silica. The silica was separated from the mother liquor by filtration, and washed four times with 1.5 liters of purified water. The wet silica cake was placed in a high purity silica crucible and dried in a Teflon ®-lined vacuum oven at 120° C. and 15 torr overnight.

Two hundred grams of silica product was thus obtained. This is equivalent to a 30% yield. The concentration of impurities in the purified silica was determined by inductively coupled plasma (ICP) atomic emission procedures. ICP is a technique used in analyzing trace impurities. The impurities content in two distinct samples of the thus-purified silica also are presented in Table 1.

This example illustrates the effectiveness of recrystallization of the purity of silica produced by ammoniation of fluosilicic acid.

COMPARATIVE EXAMPLE 1

For comparison purposes, the impurity content of a silica produced by hydrolysis of electronic grade, very high purity silicon tetrafluoride in water was measured. Gaseous silicon tetrafluoride from a gas cylinder was bubbled through high purity deionized water to form silica in accordance with reaction 1 described above.

Again the impurities content of the silica was measured by ICP.

The impurity data is presented in Table 1. The high purity silica samples produced in Examples 1 and 2 from an impure fluosilicic acid and originally from an impure source of silicon tetrafluoride had purities which are substantially equivalent to the purity silica produced by hydrolysis of a very high purity electronic grade silicon tetrafluoride.

TABLE 1

| Element Detected | Impure 25% $H_2SiF_6$ (ppm) | Example 1 (ppm) | Example 2 (ppm) | Comparative Example 1 (ppm) |
| --- | --- | --- | --- | --- |
| Al | 4.0 | 0.2 | 0.1 | 0.3 |
| B | 0.1 | 0.1 | 0.1 | 0.1 |
| Ca | — | 1.3 | 0.6 | 0.1 |
| Co | — | T | T | T |
| Cr | 6.0 | T | 0.1 | T |
| Cu | — | T | T | T |
| Fe | 34.0 | 0.9 | 0.6 | 0.3 |
| K | — | 0.1 | 0.2 | 0.1 |
| Mg | — | 0.4 | 0.8 | 0.6 |
| Mn | — | T | T | T |
| Na | — | T | T | 0.2 |
| Ni | 4.3 | 0.1 | 0.1 | T |
| P | 0.9 | 0.2 | 0.1 | 0.1 |
| V | 0.1 | T | — | T |
| Zn | — | 0.2 | — | 0.1 |
| S | 55.0 | 0.3 | — | 1.3 |
| Radioactive elements, ppb | | | | |
| U | 8 | 0.45 | 1 | — |
| Th | — | 0.46 | — | — |

T = less than or equal to 0.05 ppm.

EXAMPLE 3

Weak phosphoric acid recycled from the gypsum filtration step of a wet phosphoric acid process was mixed with concentrated sulfuric acid (92–98 percent). The dehydration of fluosilicic acid contained in the weak phosphoric acid caused fluosilicic acid to decompose into gaseous silicon tetrafluoride. This process was further facilitated by the heat of dilution of sulfuric acid. Air was purged through the mixed acid as a carrier gas. The air-silicon tetrafluoride mixture was forced through filters to remove entrained liquid droplets, then was bubbled into a 14 percent ammonium fluoride solution to form a solution of ammonium fluosilicate having an ammonium fluosilicate concentration of 25 percent.

One thousand two hundred fifty kg of the 25 percent ammonium fluosilicate solution was cooled to 10° C. to crystallize ammonium fluosilicate. The ammonium fluosilicate crystals were separated from the mother liquor with a centrifugal filter and were rinsed briefly with cold deionized water. Analyses of the 150 kg of ammonium fluosilicate crystals and the 1,100 kg of mother liquor are summarized in Table 2.

The ammonium fluosilicate crystals were dissolved in 360 kg of deionized water, and this solution was kept at a temperature above 85° C. to prevent precipitation of the salt. Ammonia was charged into the solution to decompose the ammonium fluosilicate into silica and ammonium fluoride. The reaction temperature was maintained at over 80° C. until the concentration of ammonium fluosilicate was less than about 5 percent. Then, the reaction medium was cooled to about 45°–50° C. to facilitate ammonia absorption into the solution. When the final $NH_3/F$ mole ratio reached about 1.2–1.3, the ammonia was stopped and the reaction was allowed to continue without addition of ammonia for about 30 minutes. The slurry then was pumped into a centrifugal filter to separate silica and ammonium fluoride solution. After washing and drying, 45 kg of high purity silica and 460 kg high purity ammonium fluoride were recovered.

The mother liquor from the crystallization step was ammoniated in a similar manner. However, because the ammonium fluosilicate concentration (14.5 percent) did not require that the temperature exceed about 50° C., single-stage ammoniation was utilized. Silica of lower, but acceptable, quality was recovered (50kg). The ammonium fluoride solution was discarded because of the high impurity content.

Tables 3 and 4 below compare the purity of silica and ammonium fluoride solution, respectively, obtained in accordance with this Example. They illustrate the superior product produced by the method of the invention.

TABLE 2

PURITY OF AMMONIUM FLUOSILICATE
(QN 100 PERCENT SALT BASIS)

| Element, ppm | $(NH_4)_2SiF_6$ Mother Liquor | $(NH_4)_2SiF_6$ Crystals |
| --- | --- | --- |
| Al | 0.20 | 0.05 |
| Ca | 0.61 | 0.06 |
| Cr | 0.47 | 0.00 |
| Fe | 1.28 | 0.04 |
| Mg | 0.14 | 0.04 |
| Mo | 0.27 | 0.03 |
| P | 2.50 | 0.00 |
| Pb | 2.02 | 0.00 |
| S | 3545 | 0.81 |
| Zn | 0.20 | 0.00 |
| Na | 0.67 | 0.20 |
| K | 0.70 | 0.20 |
| Li | 0.70 | 0.20 |

Ba, Cd, Co, Cu, Mn, Ni, and Sr are less than 0.05 ppm or not detected in both cases.

TABLE 3

SILICA PURITY

| Source | Silica From Mother Liquor | Silica from Ammonium Fluosilicate Crystals |
| --- | --- | --- |
| Element ppm | | |
| Al | 0.36 | 0.04 |
| Ca | 0.64 | 0.14 |
| Cr | 0.08 | 0.01 |
| Fe | 2.22 | 0.26 |
| Mg | 0.00 | 0.05 |
| Mo | 0.00 | 0.00 |
| P | 0.12 | 0.30 |
| Pb | 0.15 | 0.00 |
| S | 6.54 | 0.48 |
| Zn | 0.11 | 0.03 |
| Na | 0.20 | 0.20 |
| K | 0.20 | 0.20 |
| Li | 0.20 | 0.20 |
| Radioactive elements, ppb | | |
| U | — | 1 |
| Th | — | — |

Ba, Cd, Co, Cu, Mn, Ni, and Sr are less than 0.05 ppm or not detected in both cases.

TABLE 4

AMMONIUM FLUORIDE PURITY
(40 PERCENT SOLUTION BASIS)

| Source | $NH_4F$ from Mother Liquor | $NH_4F$ from Ammonium Fluosilicate Crystals |
| --- | --- | --- |
| Element, ppm | | |
| Al | 0.44 | 0.05 |
| Ca | 0.00 | 0.02 |

TABLE 4-continued
AMMONIUM FLUORIDE PURITY
(40 PERCENT SOLUTION BASIS)

| Source | NH4F from Mother Liquor | NH4F from Ammonium Fluosilicate Crystals |
|---|---|---|
| Cr | 0.24 | 0.01 |
| Fe | 1.04 | 0.02 |
| Mg | 0.06 | 0.02 |
| Mo | 0.20 | 0.01 |
| P | 1.88 | 0.18 |
| Pb | 1.28 | 0.00 |
| S | 1976 | 0.18 |
| Zn | 0.16 | 0.01 |
| Na | 0.40 | 0.10 |
| K | 0.40 | 0.10 |
| Li | 0.40 | 0.10 |

Ba, Cd, Co, Cu, Mn, Ni, and Sr are less than 0.05 ppm or not detected in both cases.

Although preferred embodiments of the invention have been discussed herein, those skilled in the art will appreciate that changes and modifications may be made without departing from the spirit of this invention, as defined in and limited only by the scope of the appended claims. For example, those skilled in the art will recognize that impure fluosilicic acid from sources other than those discussed herein also may be treated in accordance with the method of this invention to yield a high purity silica and ammonium fluoride.

I claim:

1. A method for producing high purity silica and ammonium fluoride comprising:
   (a) recovering silicon tetrafluoride-containing gas from the acidulation of a fluorine-containing phosphorus source;
   (b) separating liquid entrainment from the gas;
   (c) converting the gas recovered from step (b) to an ammonium fluosilicate solution; and
   (d) ammoniating said ammonium fluosilicate solution to produce high purity silica and ammonium fluoride.

2. The method of claim 1 wherein said fluorine-containing phosphorus source is a phosphorus-containing rock and said rock is acidulated with concentrated sulfuric acid.

3. The method of claim 1 wherein the gas from step (b) is adsorbed in high purity water to produce fluosilicic acid solution and silica precipitate, the fluosilicic acid solution being recovered separately from the silica precipitate.

4. The method of claim 3 wherein the separately-recovered fluosilicic acid solution is reacted with ammonia to yield the ammonium fluosilicate solution of step (c).

5. The method of claim 1 wherein ammonium fluosilicate crystals are recovered from the ammonium fluosilicate solution from step (c), and said crystals are redissolved to yield an ammonium fluosilicate solution prior to the ammoniation of step (d).

6. The method of claim 4 wherein ammonium fluosilicate crystals are recovered from the ammonium fluosilicate solution from step (c), and said crystals are redissolved to yield an ammonium fluosilicate solution prior to the ammoniation of step (d).

7. The method of claim 5 wherein the ammonium fluosilicate crystals are recrystallized a plurality of times to purify the ammonium fluosilicate solution.

8. The method of claim 1 wherein the ammoniation of step (d) comprises contacting the aqueous solution of step (c) with ammonia at a temperature between about 25° and 85° C.

9. The method of claim 8 wherein the ammoniation of step (d) comprises contacting the aqueous solution of step (c) with ammonia at a temperature between about 75° and 85° C. until the ammonium fluosilicate concentration is less than about 10 wt. percent, then reducing the temperature to between about 40°-60° C. for the remainder of the ammoniation.

10. A method for producing high purity silica and ammonium fluoride comprising:
    (a) recovering silicon tetrafluoride-containing gas from the acidulation of a fluorine-containing phosphorus source;
    (b) separating liquid entrainment from the gas;
    (c) converting the gas recovered from step (b) to an ammonium fluosilicate solution by absorbing the gas in a high purity ammonium fluoride solution; and
    (d) ammoniating said ammonium fluosilicate solution to produce high purity silica and ammonium fluoride.

11. A method for producing high purity silica and ammonium fluoride comprising:
    (a) recovering silicon tetrafluoride-containing gas from the acidulation of a fluorine-containing phosphorus source;
    (b) separating liquid entrainment from the gas;
    (c) absorbing the gas from step (b) in high purity water to produce fluosilicic acid solution and silica precipitate, the fluosilicic acid solution being recovered separately from the silica precipitate;
    (d) reacting the recovered fluosilicic acid solution with ammonium fluoride to yield ammonium fluosilicate solution; and
    (e) ammoniating said ammonium fluosilicate solution to produce high purity silica and ammonium fluoride.

12. The method of claim 10 wherein ammonium fluosilicate crystals are recovered from the ammonium fluosilicate solution from step (c), and said crystals are redissolved to yield and ammonium fluosilicate solution prior to the ammoniation of step (d).

13. The method of claim 11 wherein ammonium fluosilicate crystals are recovered from the ammonium fluosilicate solution from step (d), and said crystals are redissolved to yield an ammonium fluosilicate solution prior to the ammoniation of step (e).

14. The method of claim 10 wherein said fluorine-containing phosphorus source is a phosphorus-containing rock and said rock is acidulated with concentrated sulfuric acid.

15. The method of claim 11 wherein said fluorine-containing phosphorus source is a phosphorus-containing rock and said rock is acidulated with concentrated sulfuric acid.

* * * * *

UNITED STATES PATENT AND TRADEMARK OFFICE
CERTIFICATE OF CORRECTION

PATENT NO. : 5,165,907
DATED : November 24, 1992
INVENTOR(S) : Paul C. Chieng

It is certified that error appears in the above-identified patent and that said Letters Patent is hereby corrected as shown below:

Column 1, line 63, delete thw word "product" and substitute -- produce --

Column 2, line 23, delete the word "integrate" and substitute --integrated--

Column 4, line 26, delete the word "sued" and substitute -- used --

Column 5, line 45, delete the word "form" and substitute -- from --

Column 6, line 39, following the number "25" delete -- + --

Column 6, line 55, delete the number "100" and substitute -- 110 --

Column 8, line 37, delete the word "recycle" and substitute -- recycled --

Column 8, line 39, delete "quire" and substitute -- quite --

Column 11, line 53, delete the number "1,100" and substitute -- 1,110 --

Column 12, line 21, table 2, delete "QN" and substitute -- ON --

Signed and Sealed this

Twenty-fourth Day of May, 1994

*Attest:*

BRUCE LEHMAN

*Attesting Officer*  *Commissioner of Patents and Trademarks*